No. 756,767. PATENTED APR. 5, 1904.
J. H. YOUNGKEN.
RUNNER AND PROPELLING ATTACHMENT FOR BICYCLES
OR OTHER VEHICLES.
APPLICATION FILED SEPT. 14, 1903.
NO MODEL.
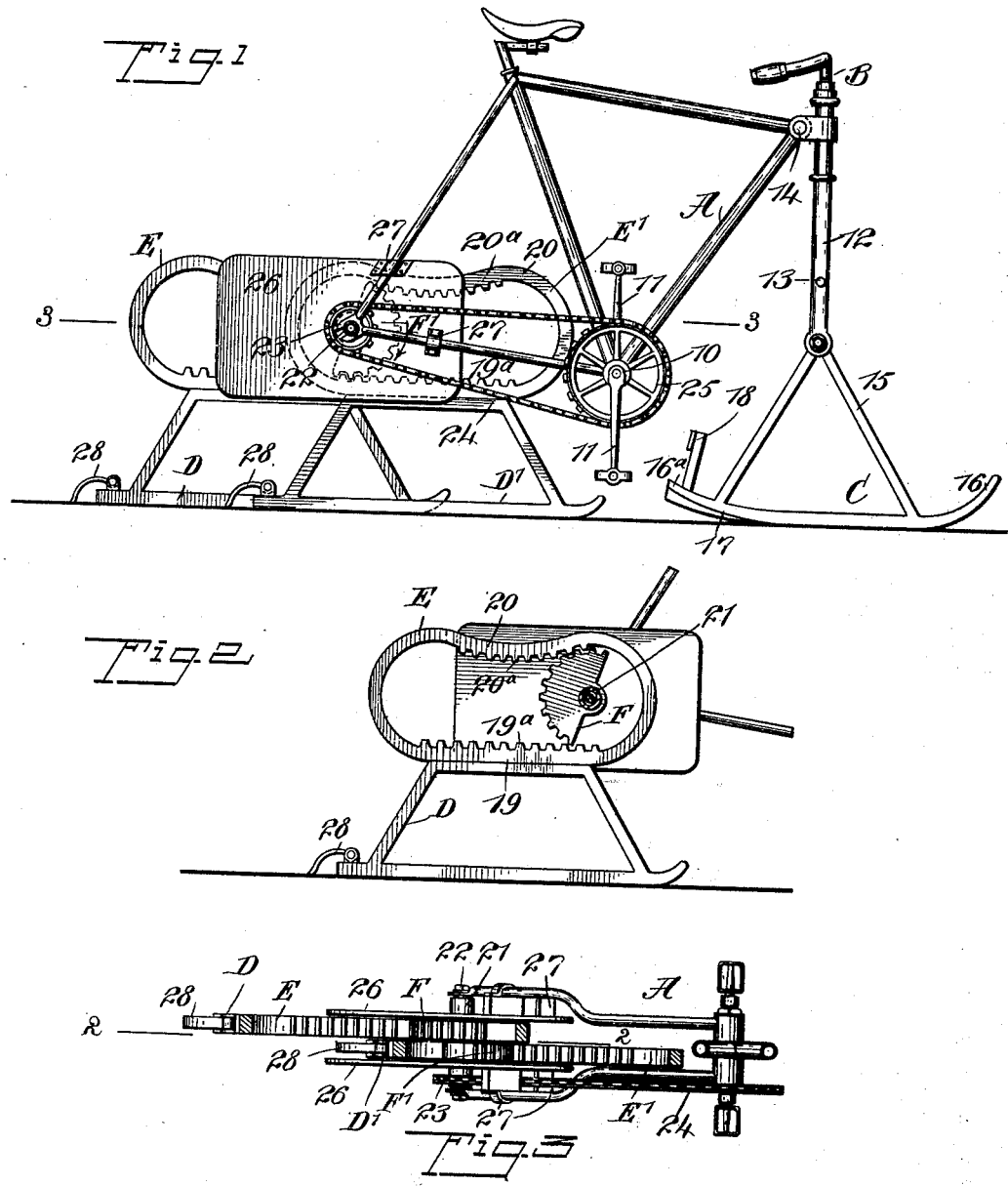
WITNESSES:
INVENTOR
John H. Youngken
BY
ATTORNEYS No. 756,767.  
Patented April 5, 1904.

UNITED STATES PATENT OFFICE.

JOHN HARVEY YOUNGKEN, OF VIRGINIA CITY, MONTANA.

RUNNER AND PROPELLING ATTACHMENT FOR BICYCLES OR OTHER VEHICLES.

SPECIFICATION forming part of Letters Patent No. 756,767, dated April 5, 1904.

Application filed September 14, 1903. Serial No. 173,113. (No model.)

*To all whom it may concern:*

Be it known that I, JOHN HARVEY YOUNGKEN, a citizen of the United States, and a resident of Virginia City, in the county of Madison and State of Montana, have invented a new and Improved Runner and Propelling Attachment for Bicycles or other Vehicles, of which the following is a full, clear, and exact description.

My invention relates to runners and propelling attachments for bicycles, automobiles, and other vehicles; and the purpose of the invention is to provide runners in one or more pairs or a pair of rear runners and a single forward guide-runner and means connected with each runner of a pair so constructed and so operated by the motive power of the vehicle that the runners will be alternately lifted and advanced, one runner of a pair bearing the weight of the machine while the other runner is being advanced and slightly lifted in advancing. Thus when the mechanism is acting upon the stationary runner said runner bears the weight of the machine, and the frame of the machine is sent forward at the same time as the other runner is lifted and advanced, which latter runner in its turn sustains the weight while its following runner is being carried proportionately forward, and in this manner the machine is propelled.

Another purpose of the invention is to provide means for preventing a backward movement of the runners and to so construct both the runners that they may be quickly and conveniently connected with any axle after the wheels are removed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a bicycle having the attachment applied. Fig. 2 is a longitudinal vertical section taken practically on the line 2 2 of Fig. 3, showing a runner, a connected mangle-rack, and a pinion for the rack in side elevation; and Fig. 3 is a horizontal section taken practically on the line 3 3 of Fig. 1.

A represents the frame of the bicycle, B the handle-bar usually accompanying such a frame, the frame having the ordinary pedal-shaft 10 and pedals 11, together with the forward fork 12, in which the handle-bar B is mounted, and C represents a forward runner, which is attached to the said front fork 12 after the ordinary wheel has been removed from the said fork. As illustrated, the forward fork 12 is pivotally attached to the frame A, as is shown at 14 in Fig. 1, so that the handle-bar can be drawn rearward or toward the rider, whereby to bring the heel portion of the front runner in forcible engagement with the surface over which it passes, at the same time causing the front of the runner to be elevated. The runner is provided with braces or knees 15 for attachment to the lower portion of the front fork 12, and the forward end 16 of the runner C is upwardly curved. The rear or heel end $16^a$ of the runner is likewise upwardly curved to a greater or less extent; but on the under face of the heel $16^a$ of the runner C a knife-edge 17 is formed, which when the heel portion of the runner is pressed downward will so engage with the ice or snow over which the vehicle is passing as to retard the progress of the vehicle, and thereby serve as a brake. Said braking engagement between the runner and the surface supporting it may be accentuated by attaching a foot-bar 18 to the upper portion of the heel, so that the rider may press downward on this bar with his feet, thus assisting the braking action at the handle-bar. The fork 12 has the usual foot-rest 13 for coasting purposes.

The propelling-runners and their connected mechanism are shown in pairs and are located at the back of the frame as a substitute for the rear wheel of a bicycle or the rear wheels of a tricycle.

The two propelling-runners are designated as D and D' and are alike, being constructed in any suitable or approved manner. On the upper portion of the runner D a mangle-rack E is secured, extending in direction of the front and the rear of the machine, and a corresponding mangle-rack E' is secured upon the upper portion of the runner D'. In the construction of the mangle-racks illustrated the bottom sections 19 are straight and are provided with interiorly-located teeth $19^a$, arranged in a horizontal plane; but the upper portion 20 of each mangle-rack is inwardly convexed, as is best shown in Fig. 2, and on the said convexed edge of the part 20 teeth $20^a$ are located. The end portions of each mangle-rack, however, are free from teeth. A pinion is provided for each mangle-rack, the pinions being preferably segmental, and the said pinions are designated as F and F', the pinion F having movement in the rack E and the pinion F' in the rack E'. Both of these pinions are mounted on a hub 21; but the toothed portions of the pinions face in opposite directions, as is shown in Fig. 3. The hub 21 is adapted to be placed on a shaft 22, which shaft usually carries the hub of the rear wheel of a bicycle, and at one end of the said hub 21 a sprocket-pinion 23 is secured, shown connected by a driving-chain 24 with a driving-gear 25 on the pedal-shaft 10.

Guide-shields 26 are provided for the mangle-racks E and E', which shields are located at the outer sides of the racks, having openings through which the hub 21 extends, and these shields are held in position by brackets 27, readily removable. These brackets attach the shields to the frame A of the machine.

In order that the runners D and D' shall not have a rearward movement, stop-arms 28 are hinged to the rear ends of the shoe-sections of the runners, which arms curve downward for engagement at their free ends with the surface over which the runners pass. By pivoting these stop-arms 28 to the runners they are free to move upward when desired and will readily pass any obstruction, immediately dropping to working position after the obstruction is passed.

In the operation of the machine to which the attachment is applied one runner will be normally in advance of the other, and when the pinion of one mangle-rack is in engagement with the upper teeth $20^a$ the said rack and connected runner will be slightly raised and advanced a certain distance, while at the same time the other pinion acting on the lower teeth of the other mangle-rack will serve to force this latter mangle-rack firmly in engagement with the surface traveled over, thus causing it to sustain the burden of the weight and causing the frame of the machine to be moved forward proportionately to the advanced movement of the runner just carried forward. As soon as the advanced runner is firmly seated on the snow or ice its pinion engages with the lower teeth $19^a$ of its mangle-rack, and this runner is then pressed downward and the frame is again moved forward, while the other runner will be lifted and advanced by reason of its pinion engaging with the upper teeth on its mangle-rack. It will therefore be observed that a positive and steady forward progressive movement is obtained, the rapidity of the movement being limited only by the rapidity by which the driving-pinions can be operated, and that the entire mechanism of the attachment is exceedingly simple and well adapted for the purpose intended and, furthermore, may be readily attached to or detached from the vehicle to which it is to be applied.

I desire it to be understood that with slight modifications—for example, in the arrangement of the mangle-racks—the attachment can be applied to automobiles or vehicles of any character and that the motive power ordinarily employed on the vehicle to which application is made is that which is utilized to operate the attachment.

I am aware that many cycles have a rigid post and that the fork could not be pulled back as indicated in the drawings. Therefore to provide for the application of the improvement to such construction the runner C is pivotally mounted, so that the foot can brake on the element $16^a$, and a slight bar is then placed across the back of the fork adjacent to the knees of the rider to prevent the runner C being pulled back into the frame or pedal sprocket; but this construction would not prevent the front of the runner C from being elevated and back-pressed into the surface over which it passes.

Having thus described my invention, I claim as new and desire to secure by Letters Patent—

1. In runner attachments for vehicles, runners, elongated propelling members attached to said runners, and mechanism coacting with said propelling members to alternately bring the runners one in advance of the other, each propelling member having a curved section, said sections being alternately engaged by said coacting mechanism to first elevate and then gradually lower each runner as it is carried forward, the length of a forward step being determined by the length of the elongated propelling members and the distance each runner is elevated, as a step is taken, being determined by the amount of curvature given to the curved sections of the propelling members.

2. In runner attachments for vehicles, runners, means for holding the runners in parallel independent relation, and coacting mechanism for the runners, adapted to move the runners alternately in advance of each other, said mechanism comprising a propelling member secured to each runner, and means for alternately engaging, first one side of a propelling member to simultaneously elevate the runner connected therewith, and move it forward and bring it in engagement with the ground again, said means then engaging the other propelling member to propel the opposite runner forward.

3. In runner attachments for vehicles, independent runners, guides for maintaining the runners in parallel position, a mangle-rack secured to each runner, a shaft independent of the mangle-racks and runners, a support for the said shaft, and segmental pinions carried by the said shaft, extending in opposite directions therefrom, each pinion being adapted for engagement with one of the said racks, as described.

4. In a runner attachment for vehicles, independent runners, guides maintaining the said runners in parallel position, a mangle-rack secured to the upper portion of each runner, each mangle-rack being provided with upper and lower interiorly-located teeth, the lower teeth being in a horizontal plane and the upper teeth having convexed arrangement, a shaft independent of the runners and the racks, a support for the shaft, and segmental pinions attached to the shaft and extending in opposite directions therefrom, the pinions operating independently on the respective racks, as described.

5. In a runner attachment for vehicles, independent runners, guides for maintaining the said runners in parallel position, a mangle-rack secured to the upper portion of each runner, each mangle-rack being provided with upper and lower interiorly-located teeth, the lower teeth being in a horizontal plane and the upper teeth having convexed arrangement, a shaft independent of the runners and the racks, a support for the shaft, segmental pinions attached to the shaft and extending in opposite directions therefrom, the pinions operating independently on the respective racks, a driving mechanism for the said shaft, and stop-arms located at the rear of the runners, adapted to engage with the surface over which the runners travel and prevent rearward movement of the runners, as set forth.

6. A frame for a bicycle or a like machine, a pedal-shaft for the frame, a front fork or head pivotally connected with the frame, a handle-bar carried by the front fork or head, and a forward runner connected with the said front fork or head, having its ends upwardly curved and provided with a knife-edge on the tread-surface of its rear end, rear runners, guides for the said runners, maintaining them in independent and parallel position, a mangle-rack secured to each runner at its upper portion, a shaft journaled in the rear portion of the frame, segmental pinions secured to the shaft, extending in opposite directions therefrom, the pinions coacting one with each rack, and a driving connection between the pedal-shaft and the pinion-shaft, as described.

7. A frame for a bicycle or like machine, a front fork or head pivotally connected with the frame to turn thereon and to rock backwardly and forwardly, the upper end of said head extending above the pivot-point, a handle-bar connected with said head above its pivot-point, a runner secured to said fork at its lower end and having its ends upwardly curved and a knife-edge on the rear portion of the under side of said runner, adapted to be rocked into engagement with the surface upon which the machine is running.

In testimony whereof I have signed my name to this specification in the presence of two subscribing witnesses.

JOHN HARVEY YOUNGKEN.

Witnesses:
CLARK. W. KELLOGG,
FRED D. MALONE.